June 9, 1925.
S. C. LAMBERT
MOTOR VEHICLE CLUTCH
Filed June 7, 1920
1,541,057
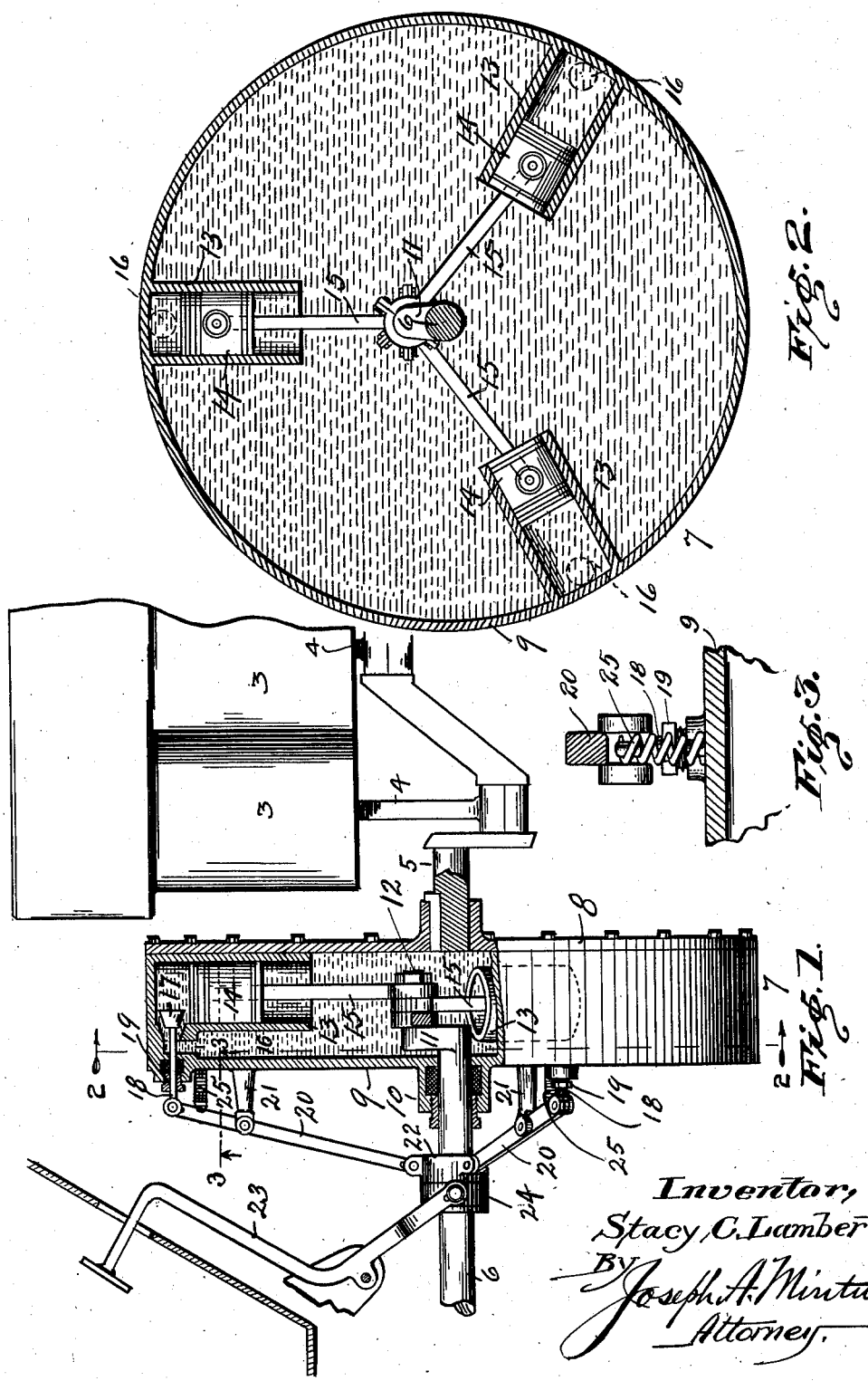
Inventor,
Stacy C. Lambert,
By Joseph A. Minturn
Attorney.

Patented June 9, 1925.

1,541,057

UNITED STATES PATENT OFFICE.

STACY C. LAMBERT, OF CLAYTON, INDIANA, ASSIGNOR OF ONE-HALF TO ALBE R. MARLEY, TRUSTEE, OF CLAYTON, INDIANA.

MOTOR-VEHICLE CLUTCH.

Application filed June 7, 1920. Serial No. 387,130.

*To all whom it may concern:*

Be it known that I, STACY C. LAMBERT, a citizen of the United States, and resident of Clayton, in the county of Hendricks and the State of Indiana, have invented a new and useful Improvement in Motor-Vehicle Clutches, of which the following is a specification.

This invention relates to improvements in clutches for connecting the crank-shaft with the propeller-shaft of automobiles, trucks, tractors and other motor-driven vehicles; and the object of the invention is—

First, to provide a clutch that will transmit power gradually from nothing to full transmission in order to gain momentum without developing a wrecking strain on the mechanism involved.

Second, to reduce the wear on the involved mechanism and increase the period of its usefulness.

Third, to simplify the control of mechanism of this character thereby reducing to minimum the effort and skill required to operate it.

Fourth, to simplify and cheapen the initial cost of production and the cost of maintenance thereafter.

I accomplish the above, and other objects which will hereinafter appear, by the mechanism illustrated in the accompanying drawing, in which—

Figure 1 is a diagram showing part of a multi-cylinder gas engine and crank-shaft and a propeller-shaft in side elevation with my invention in partial section connecting the crank-shaft and propeller-shaft, Fig 2 is a section on the line 2—2 of Fig. 1 and Fig. 3 is a section on the line 3—3 of Fig. 1 of the drawing.

The engine cylinders 3, connecting rods 4, crank-shaft 5 and propeller-shaft 6 are of any usual and suitable construction.

Mounted on the crank-shaft 5 is a cylindrical drum 7 which rotates with the shaft. It has a side 8 bolted to the rest of the drum and thereby removable for access to the drum interior. Supported by the main or body-portion 9 of the drum is a journal 10 in which the adjacent end of the propeller shaft 6 is mounted and through which journal the shaft enters the drum. Mounted on the propeller-shaft within the drum is a crank 11 which supports a pin 12.

Mounted within the drum and fixed thereto are a plurality of cylinders 13, here shown as three in number assembled equidistant from each other with radial axes intersecting in the axis of the propeller-shaft. In each cylinder is a reciprocating piston 14, and all three of said pistons are connected with the crank-pin 12 by connecting-rods 15. The outer end of each cylinder, beyond the maximum travel of the piston has a port 16, which communicates with the interior of the drum. The drum is filled with fluid oil that is changed with the seasons to insure proper fluidity in hot and cold weather, and to insure that no air spaces are left in the drum the filling with oil is preferably done under suitable pressure and conditions. Formed in the cylinder-end of each port is a tapering valve seat to receive a correspondingly shaped valve 17, the tapers insuring a better control over the flow of oil through the port. Each valve has a stem 18 which passes out of the drum through glands 19 packed to prevent leakage of oil from the drum. Each stem is connected with an outer end of a corresponding one of a series of levers 20. The levers are pivoted to posts 21 and have their inner ends connected with ears on a sleeve 22. The sleeve is mounted on the propeller-shaft 6, and has sliding adjustment thereon, controlled by a foot-lever 23 having a yoke at its lower end which is pivoted to pins on a collar 24, mounted in a channel of the sliding sleeve. The pivot-openings in lever 23, and also in the three levers 20, are suitably elongated for the free operation of the levers without binding at said pivots. A normal closure of the valves 17 is secured by spirally wound springs 25, shown under compression in Fig. 1 which press the outer ends of levers 20 away from the drum.

In the operation of my device, the clutch is normally in engaged or holding position and is released, as when it is desired to start a car from a position of rest, by the operator pressing the end of lever 23 with his foot. This slides sleeve 22 away from the drum on shaft 6, and swings the levers 20 to move valves 17 to open positions. Then by the reciprocation of the pistons in their cylinders the drum is allowed to rotate without turning the propeller-shaft. But by a gradual release of the foot-lever the valves 17 are correspondingly closed by the action of springs 25, and the movement of the pistons retarded, which begins to rotate the propeller-shaft; and when the valves are entirely closed the pistons are locked by the resistance of the oil in the cylinders and then the drum and propeller-shaft rotate together as one. The parts within the drum are perfectly lubricated, all dirt and waste is prevented by the sealed condition of the drum and long continued service is insured.

The mechanism here shown is by way of illustration only, and is subject to modification without departing from the spirit of my invention. I therefore do not desire to be limited unduly or any more than is required by the appended claims.

I claim:

1. A crank-shaft, a drum fixed to the crank-shaft and filled with liquid oil, a propeller-shaft entering the drum and having a crank, one or more cylinders fixed within and to the drum, pistons in the cylinders, rods connecting the pistons with the crank on the propeller-shaft, a port-communication between each cylinder and the drum-interior having an outwardly tapering valve-seat, a tapering valve for each seat through which port the cylinder is charged and discharged, automatic seating means for each valve comprising a pivoted lever with which the valve is connected, and a spring to appropriately move the lever, said lever and spring being externally of the drum, and manually operated means for moving the lever in opposition to the spring comprising a sleeve sliding on the propeller shaft to which sleeve the valve connected levers are attached and means operated manually for sliding the sleeve.

2. A crank-shaft, a drum fixed to the crank-shaft and filled with liquid oil, a propeller-shaft entering the drum and having a crank, one or more cylinders fixed within and to the drum, pistons in the cylinders, rods connecting the pistons with the crank on the propeller-shaft, a port-communication between each cylinder and the drum interior having a tapering valve seat, a tapering valve for each seat each having a stem terminating outside of the drum through which port the cylinder is charged and discharged, a pivoted lever for each valve to which the stem of the valve is secured, said levers having elongated end pivot openings, a sleeve slidingly mounted on the propeller-shaft to which sleeve all of the valve-levers are secured, a foot lever for manually sliding the sleeve to open the valves, and spring means for closing the valves when the foot lever is released located externally of the drum.

Signed at Indianapolis, Indiana, this the 2nd day of June, 1920.

STACY C. LAMBERT.